United States Patent [19]

Duttweiler

[11] Patent Number: 4,562,312
[45] Date of Patent: Dec. 31, 1985

[54] SUBSAMPLING DELAY ESTIMATOR FOR AN ECHO CANCELER

[75] Inventor: Donald L. Duttweiler, Rumson, N.J.

[73] Assignee: AT&T Bell Laboratories, Murray Hill, N.J.

[21] Appl. No.: 467,322

[22] Filed: Feb. 17, 1983

[51] Int. Cl.⁴ .................. G04F 10/00; H04B 3/20
[52] U.S. Cl. ..................... 179/170.2; 375/102; 370/32; 364/728; 364/824; 324/77 H
[58] Field of Search ............ 324/77 G, 77 H; 328/55; 364/569, 724, 728, 824, 604; 370/32; 179/170.2; 375/102, 96, 14

[56] References Cited

U.S. PATENT DOCUMENTS

| | | | |
|---|---|---|---|
| 3,535,473 | 10/1970 | Flanagan et al. | 179/170.2 |
| 3,721,777 | 3/1973 | Thomas | 179/170.2 |
| 3,875,500 | 4/1975 | Fletcher et al. | 324/77 H |
| 3,906,213 | 9/1975 | Meriaux et al. | 324/77 H |
| 4,025,775 | 5/1977 | Beauvis et al. | 364/604 |
| 4,097,801 | 6/1978 | Freeman et al. | 364/728 X |
| 4,334,128 | 6/1982 | Snijders | 179/170.2 |
| 4,355,214 | 10/1982 | Levy et al. | 179/170.2 |

OTHER PUBLICATIONS

Preliminary Disclosure, AMI S2816, American Microsystems Incorporated, Jul. 1981.

*Primary Examiner*—Gene Z. Rubinson
*Assistant Examiner*—R. Vaas
*Attorney, Agent, or Firm*—Thomas Stafford

[57] ABSTRACT

An estimate of delay (Δ) in a communication circuit is obtained by subsampling (via 110–114) signals incoming (X(K)) to and outgoing (Y(K)) from the communication circuit, obtaining a cross correlation (via 120, 121) of the subsampled signals and processing (via 122) the cross correlation in accordance with a prescribed algorithm.

In one application (FIG. 1) the delay estimate (Δ) is used in conjunction with an adjustable delay (101) connected in series with a "short" echo canceler (102) across the communication circuit for cancelling echoes.

16 Claims, 4 Drawing Figures

4,562,312

SUBSAMPLING DELAY ESTIMATOR FOR AN ECHO CANCELER

TECHNICAL FIELD

This invention relates to cancellation of echoes in a communication circuit and, more particularly, to estimating the delay in the communication circuit.

BACKGROUND OF THE INVENTION

Echo cancelers are now commonly used to cancel echoes in communication circuits. As echo delay path in a communication circuit can be quite long resulting in a long delay interval, for example, 64 milliseconds. Additionally, the echo delay path may vary substantially from one communication circuit to another. Therefore, a transversal filter used in the echo canceler must be capable of modeling an impulse response characteristic including the 64 millisecond delay. Consequently, the number of so-called taps and associated processing circuitry required in the transversal filter becomes quite large. For example, if the echo canceler sampling rate $K^{-1}$ is 8 kHz, 512 taps are required to model a 64 millisecond impulse response. Therefore, the resulting echo canceler is complex and expensive to implement. Moreover, as the number of taps increases the time to converge the impulse response to a desired quality also increases because of the processing complexity. Otherwise, the echo canceler may become unstable.

One attempt at overcoming the problems associated with a large number of taps in an echo canceler is disclosed in U.S. Pat. No. 3,721,777 issued to E. J. Thomas on Mar. 20, 1973. In this prior arrangement, a so-called "short" echo canceler is connected in series with an adjustable delay unit across the echo delay path. A delay estimator is also connected across the echo delay path for generating an estimate of the delay by cross correlating a received signal and a resulting echo signal in the echo path and, accordingly, adjusting the adjustable delay. However, the delay estimator requires a delay line having a number of taps and associated multipliers and integrators equal to that which an equivalent echo canceler would need. Therefore, there is no savings in processing complexity over an individual "long" echo canceler and, apparently, savings would only result if the delay estimator was multiplexed with a large number of the short canceler and delay unit combinations.

SUMMARY OF THE INVENTION

Processing complexity is reduced in a delay estimator, in accordance with an aspect of the invention, by filtering a signal incoming to a delay path and a resulting delayed version thereof to a subbandwidth smaller than that of the incoming signal and by sampling the filtered signals at a predetermined rate. In one example, the subsampling rate is a submultiple of the incoming signal sampling rate. The subband sampled signals are cross correlated and processed to generate an estimate of the delay interval of the delay path.

In one embodiment of the invention, bandpass filters are employed to obtain the subband signals and an adaptive filter is used to generate a cross correlated version of the sampled subband signals. More specifically, the adaptive filter impulse response tap weight estimates are processed in accordance with a prescribed algorithm to generate the delay estimate.

In one application, the delay estimator is employed in conjunction with an adjustable delay unit connected in series with a so-called "short" echo canceler connected across the delay path to cancel echoes developed in the delay path.

BRIEF DESCRIPTION OF THE DRAWINGS

The invention will be more fully understood from the following detailed description of an illustrative embodiment taken in connection with the appended figures in which.

DETAILED DESCRIPTION

Figure 1:
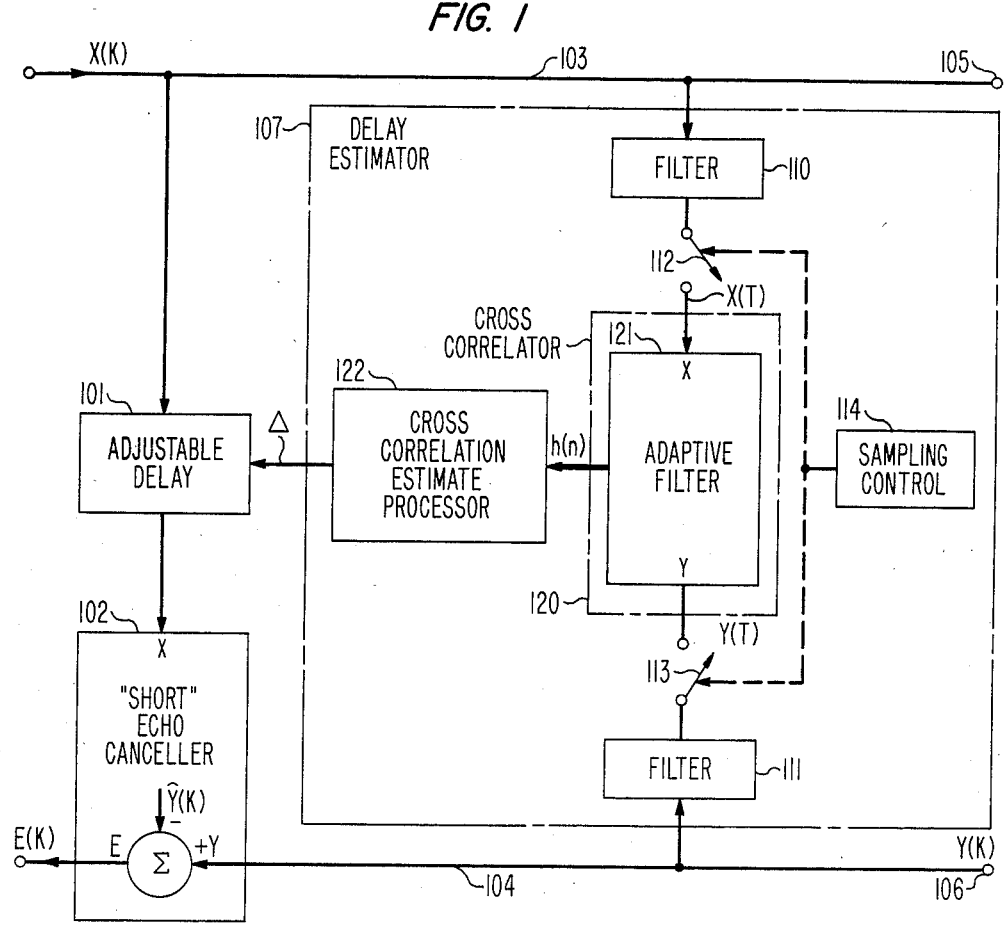
FIG. 1 shows in simplified block diagram form an echo canceler arrangement including an embodiment of the invention.

FIG. 1 illustrates in simplified block diagram form an echo canceler arrangement employing an embodiment of the invention. Accordingly, shown are adjustable delay unit 101 connected in series with a so-called "short" echo canceler 102 between first transmission path 103 and second transmission path 104. Transmission paths 103 and 104 are adapted to be connected via terminals 105 and 106, respectively, to a delay path, e.g., an echo path not shown. Also shown connected between transmission paths 103 and 104 is delay estimator 107 including an embodiment of the invention.

Adjustable delay 101 is employed to couple a delayed version of incoming signal X(K) from first transmission path 103 to short echo canceler 102. Incoming signal X(K) may be, for example, a digitally sampled speech signal, where K is an integer identifying the sampling interval. Adjustable delay 101 is responsive to delay estimate signal Δ from delay estimator 107 to delay incoming signal X(K) by an interval substantially equal to the delay encountered in the delay path connected to terminals 105 and 106. Details of adjustable delay 101 are shown in FIG. 2 and described below.

Figure 4:
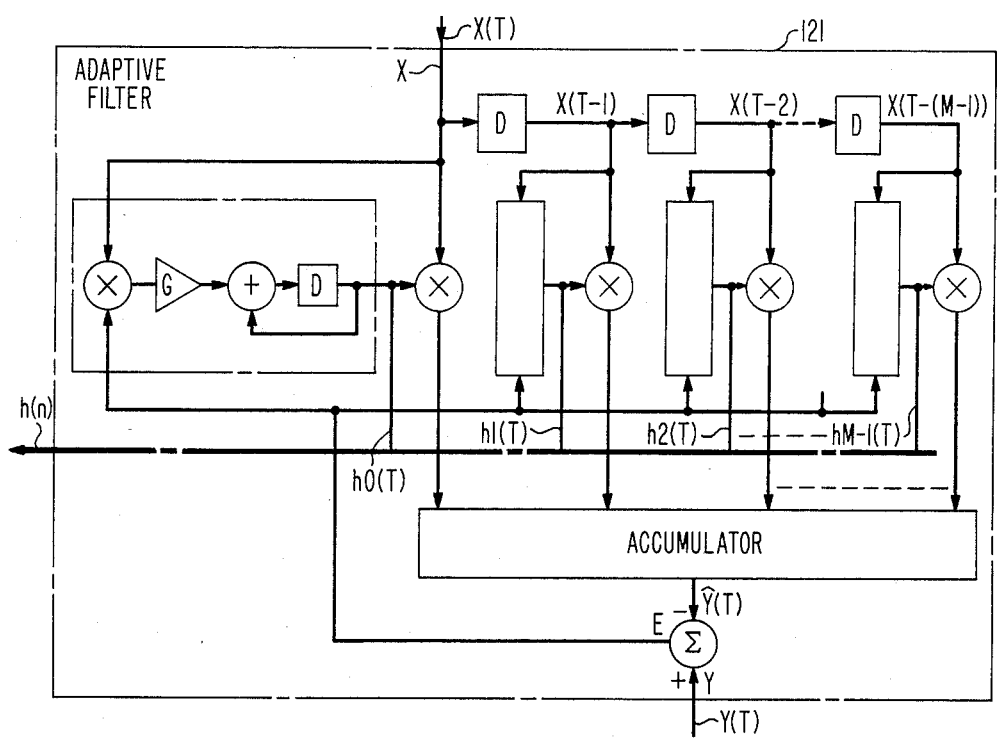
FIG. 4 illustrates also in simplified form details of the adaptive filter of FIG. 1.

"Short" echo canceler 102 is of a type including adaptive transversal filter broadly disclosed in U.S. Pat. No. 3,500,000 and described in an article by D. L. Duttweiler and Y. S. Chen entitled, "A Single-Chip VLSI Echo Canceler", *The Bell System Technical Journal, Vol.* 59, No. 2, February 1980, pages 149-160. Briefly, echo canceler 102 has a receive input (X), transmit input (Y) and a transmit output (E). The echo canceler operates in known fashion to generate a signal estimate Ŷ which is algebraically combined with outgoing signal Y(K) supplied to transmit input Y to generate error signal E(K) at the transmit output E. Error signal E(K) is used internally in the echo canceler to update the tap coefficient values in order to better model the impulse response characteristic being generated and drive the error signal toward a zero value. The adaptive filter shown in FIG. 4 is essentially identical to echo canceler 102.

The reason that canceler 102 is designated "short" is that it does not include as many taps as would normally be required if adjustable delay 101 was not being employed. In one example, echo canceler 102 has a predetermined number of taps (N) in order to model an impulse response interval of 8 milliseconds. Assuming the samplkng rate $K^{-1}$ of incoming signal X(K) is 8 kHz, then N=64 taps. If the longest delay encountered is 64 milliseconds, echo canceler 102 would require at least an additional 480 taps in order to center the 64 millisecond delay in the impulse response interval of canceler 102. However, in this embodiment, adjustable delay 101 provides a delay interval corresponding to the 480 taps or 60 milliseconds of delay.

Figure 2:
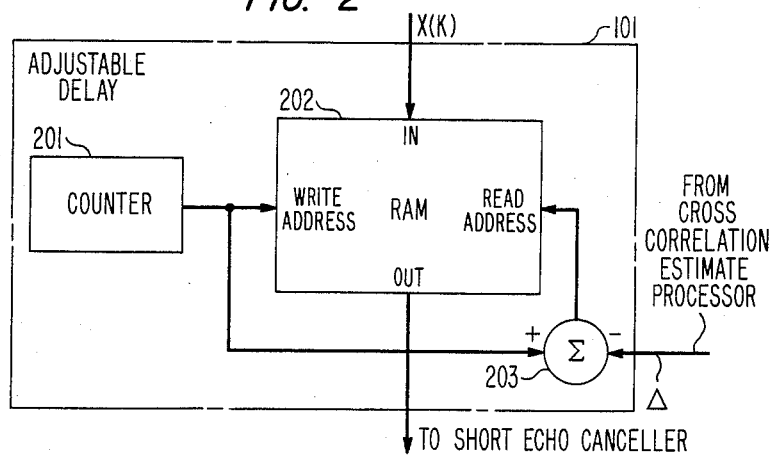
FIG. 2 depicts in simplified form details of the adjustable delay unit of FIG. 1.

FIG. 2 shows in simplified block diagram form details of one arrangement which can be used as adjustable delay 101. Accordingly, shown are counter 201 read-write memory commonly referred to as RAM 202 and algebraic summer 203. RAM 202 has a number of memory locations to realize the desired delay. In this example RAM 202 has 512 memory locations to realize up to 64 milliseconds delay. Counter 201 generates write address signals at a rate equal to the sampling rate of incoming signal samples X(K), in this example 8 kHz. Consequently, incoming samples X(K) are written into memory locations in sequence at the 8 kHz rate. The desired delay is realized by offsetting the write address signals by delay estimate Δ. The reason for this offset is to have the end of delay interval Δ occur in the center of the impulse response interval N of echo canceler 102. To this end, the write address signals from counter 201 are offset by subtracting delay estimate Δ therefrom in algebraic adder 203 and supplying the delayed read address signals to the read address input of RAM 202. Consequently, the output from RAM 202 is a version of incoming sample X(K) delayed by delay estimate Δ, in this example up to 60 milliseconds.

Returning to FIG. 1, delay estimator 107 includes filters 110 and 111 for filtering incoming signal samples X(K) and outgoing signal samples Y(K) to a subfrequency band of the incoming signal and outgoing signal frequency band. Each of band pass filters 110 and 111 must have a bandpass characteristic related to a subsampling rate $T^{-1}$. In this example, the frequency band of the incoming X(K) and outgoing Y(K) signal is that of telephone transmission, which is approximately 4 kHz and the pass band of filters 110 and 111 is chosen to be approximately 500 Hz. To this end, filters 110 and 111 are preferably digital bandpass filters of a type generally described in *Digital Signal Processing*, A. V. Oppenheim and R. W. Schefer, Prentice Hall Inc., N.J., 1975. It should be noted that if incoming signal X(K) is an analog signal, then lowpass filters may be used instead of bandpass filters. Switches 112 and 113 under control of sampling control 114 sample, in accordance with an aspect of the invention, the filtered version of X(K) and Y(K) at a subsampling rate $T^{-1}$ which is a submultiple of the sampling rate $K^{-1}$ of X(K) and Y(K). In one example, subsampling rate $T^{-1}$ is one (1) kHz. Thus, the subsampling rate $T^{-1}$ is determined by a prescribed relationship to the incoming signal sampling rate $K^{-1}$, namely $T^{-1}$ is a submultiple of $K^{-1}$.

Sampled subband signals X'(T) and Y'(T) are supplied to cross correlator 120. Any one of known cross correlators may be employed to generate a cross correlated version of X'(T) and Y'(T). In this example, adaptive filter 121 is used. Details of adaptive filter 121 are shown in FIG. 4 and described below. Accordingly, the subsampled subband version X'(T) of incoming signal sample X(K) is supplied to receive input X of adaptive filter 121 and the subsampled, subband version Y'(T) of transmit input Y of adaptive filter 121. As is known, in operation adaptive filter 121 generates so-called tap weight estimate signals h(n), n=0, 1, 2, ... M-1, which represent the cross correlated version of X'(T) and Y'(T). Cross correlation signals h(n) are supplied to cross correlation estimate processor 122 which, in turn, generates delay estimate Δ in accordance with a prescribed algorithm. Delay estimate Δ is supplied to adjustable delay 101.

Figure 3:
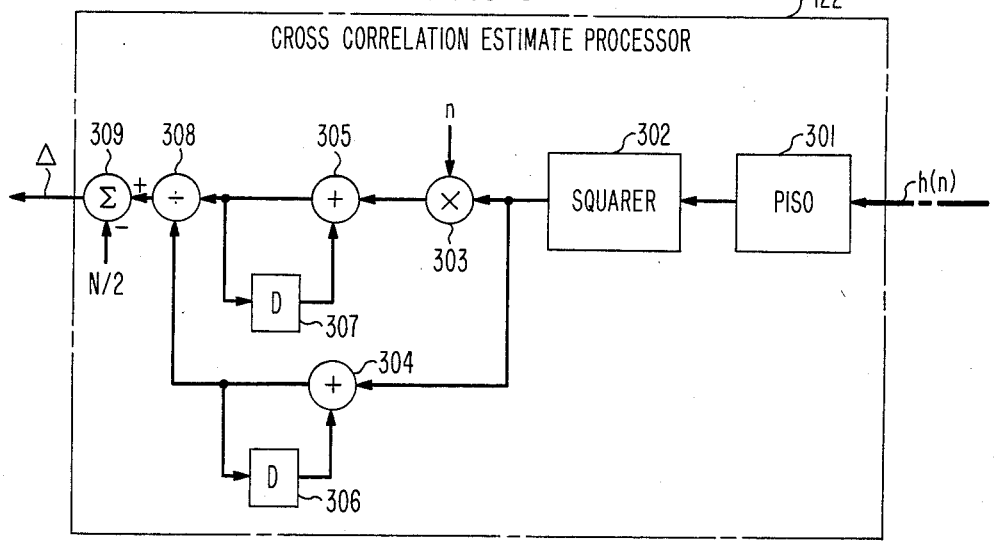
FIG. 3 shows in simplified form details of the cross correlation estimate processor of FIG. 1.

FIG. 3 depicts in simplified block diagram form details of cross correlation estimate processor 122. It is noted that several algorithms may be equally employed to process h(n) for generating delay estimate Δ. For example, the maximum one of h(n), n=0, 1, 2, ... M-1, can be selected as the delay estimate. In this embodiment, however, h(n) are processed in accordance with $$\Delta = \Delta(h,T) - \frac{N}{2} \quad (1)$$

where Δ is the desired delay estimate, N/2 is an interval to center the delay Δ(h,T) in the impulse response of short echo canceler 102 having N taps, and $$\Delta(h,T) = \frac{T \Sigma nh^2(n)}{\Sigma h^2(n)} \quad (2)$$

where T is the subsampling period and n =0, 1, 2, ... , M−1. In this example, $T^{-1}$ is one (1) millisecond.

Accordingly, shown in FIG. 3 is parallel in serial out (PISO) 301 for converting the parallel h(n) signal into serial form. Squarer 302 generates $h^2(n)$ which is supplied to multiplier 303 and adder 304. Multiplier 303 generates $nh^2(n)$ which is supplied to adder 305. Adder 304 in conjunction with delay 306 forms $\Sigma^2(n)$. Similarly, adder 305 in conjunction with delay 307 form $\Sigma nh^2(n)$. Outputs from adders 304 and 305 are supplied to divider 308 which generates $$\frac{T \Sigma nh^2(n)}{\Sigma h^2(n)}.$$

Thereafter, algebraic combiner 309 generates the desired delay estimate Δ of equation (1).

FIG. 4 illustrates in simplified block diagram form details of adaptive filter 121 of FIG. 1. Adaptive filter 121 is essentially identical in structure and operation as the echo canceler shown and described in the article entitled, "A Single-Chip VLSI Echo Canceler" noted above. One difference is that the tap weight estimates h(n), n=0, 1, 2, ..., M−1 are outputted as shown in FIG. 4. It should be noted, that the number of taps M used in adaptive filter 121 and, consequently, the number of multipliers and integrators needed is significantly reduced because of the use, in accordance with an aspect of the invention, of the subsampled subband signals. Again, by way of example, assuming the subsampling rate $T^{-1}$ is 1 kHz and the delay Δ(h,T) is 64 milliseconds, M equals 64. Whereas, if the incoming signal sampling rate, i.e., $K^{-1}$ equals 8 kHz, was employed without subband sampling, 512 taps and associated multipliers and integrators would be required.

The above described arrangement is only an example of an embodiment of the invention. It will be apparent to those skilled in the art that various changes in form and detail may be made without departing from the spirit or scope of the invention. Although the invention has been described in an echo canceler application, it is equally applicable in other applications requiring estimation of a delay interval, for example, radar and sonar range finding applications. Additionally, it will be apparent to those skilled in the art how to employ the invention with analog incoming and outgoing signals.

What is claimed is:

1. Apparatus for generating an estimate of delay in a delay path to which a first signal is supplied including samples obtained at a first sampling rate and from which a second signal is obtained which is a delayed version of said first signal, comprising, means for subsampling said first signal incoming to said delay path and said second signal from said delay path, means for obtaining a cross correlation of said subsampled first and second signals, and means for processing said cross correlation to generate said delay estimate.

2. The apparatus as defined in claim 1 wherein said subsampling means includes means for filtering said first signal to a bandwidth smaller than said first signal bandwidth, means for filtering said second signal to said smaller bandwidth and means for sampling said filtered first and second signals at a predetermined sampling rate which is a submultiple of said first signal first sampling rate.

3. The apparatus as defined in claim 2 wherein each of said filtering means includes bandpass filter means.

4. The apparatus as defined in claim 2 wherein each of said filtering means includes lowpass filter means.

5. The apparatus as defined in claim 2 wherein said sampling means samples said filtered first and second signals at said predetermined sampling rate which is in a prescribed relationship to said first sampling rate of said first signal.

6. The apparatus as defined in claim 5 wherein said first signal sampling rate is 8 kilo Hertz and said predetermined sampling rate is 1 kilo Hertz.

7. The apparatus as defined in claim 2 wherein said cross correlation obtaining means includes an adaptive filter having a predetermined number of taps and being responsive to said filtered first and second signals for generating signals representative of tap weight estimates and wherein said processing means includes means for processing said tap weight estimate signals in accordance with a prescribed criterion to generate said delay estimate.

8. The apparatus as defined in claim 7 wherein said processing prescribed criterion is $$\Delta(h,T) = \frac{T \Sigma\; nh^2(n)}{\Sigma\; h^2(n)}$$

where $\Delta(h,T)$ is a delay estimate, $h(n)$ are the tap weight estimates, $n=0, 1, 2, \ldots M-1$, where M is the number of taps in said adaptive filter and T is the sampling interval of said subsampling means.

9. Apparatus adapted to be connected to a communication circuit to which a first signal is supplied including samples obtained at a first sampling rate and from which a second signal is obtained which is a delayed version of said first signal for cancelling echo signals developed in the communication circuit, comprising, means for subsampling said first signal incoming to said communications circuit and said second signal outgoing from said communications circuit, means for obtaining a cross correlation of said subsampled first and second signals, means for processing said cross correlation to generate an estimate of delay in said communications circuit, and adjustable delay means connected in series circuit relationship with an echo canceler and adapted to be connected across said communications circuit, said adjustable delay means being responsive to said delay estimate signal for inserting a corresponding delay in series with said echo canceler.

10. The apparatus as defined in claim 9 wherein said subsampling includes means for filtering said first signal to a bandwidth smaller than said first signal bandwidth, means for filtering said second signal to said smaller bandwidth and means for sampling said filtered first and second signals at a predetermined sampling rate which is a submultiple of said first signal first sampling rate.

11. The apparatus as defined in claim 10 wherein each of said filtering means includes bandpass filter means.

12. The apparatus as defined in claim 10 wherein each of said filtering means includes lowpass filter means.

13. The apparatus as defined in claim 10 wherein said echo canceler processes signal samples having said first sampling rate and said sampling means samples said filtered first and second signals at said predetermined sampling rate which is in a prescribed relationship to said first sampling rate.

14. The apparatus as defined in claim 13 wherein said first sampling rate is 8 kilo Hertz and said predetermined sampling rate is 1 kilo Hertz.

15. The apparatus as defined in claim 10 wherein said cross correlation obtaining means includes an adaptive filter having a predetermined number of taps and being responsive to said sampled first and second filtered signals for generating signals representative of tap weight estimates and wherein said processing means includes means for processing said tap weight estimate signals in accordance with a prescribed criterion to generate said delay estimate.

16. The appratus as defined in claim 15 wherein said processing prescribed criterion is $$\Delta(h,T) = \frac{T \Sigma\; nh^2(n)}{\Sigma\; h^2(n)}$$

where $\Delta$ is a delay estimate, $h(n)$ are the tap weight estimates, $n=1, 1, 2, \ldots M-1$, were M is the number of taps in said adaptive filter and T is the sampling interval of said subsampling means.

* * * * *